Figure 4:
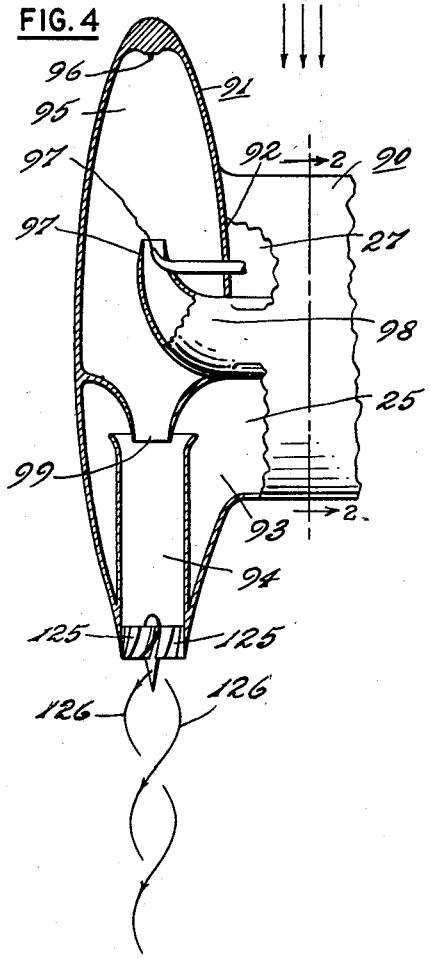

March 8, 1960    R. W. GRISWOLD II    2,927,748
DIRECT LIFT AIRFOILS
Filed April 30, 1954    2 Sheets-Sheet 1
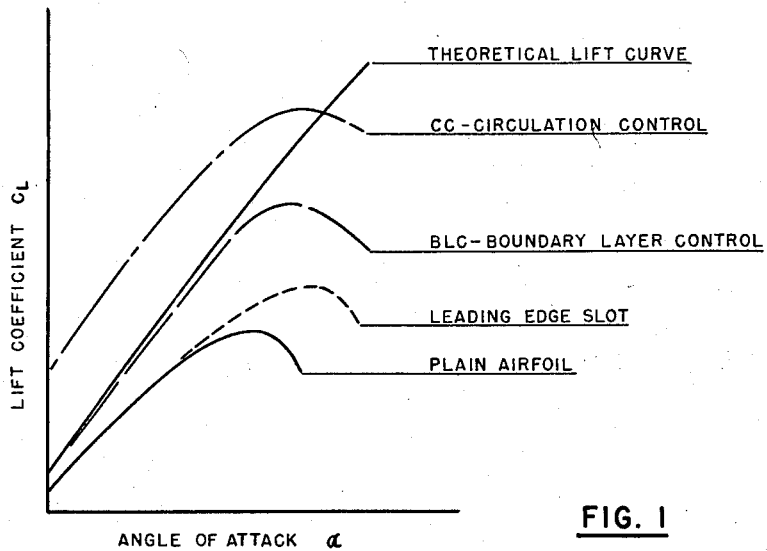
FIG. 1
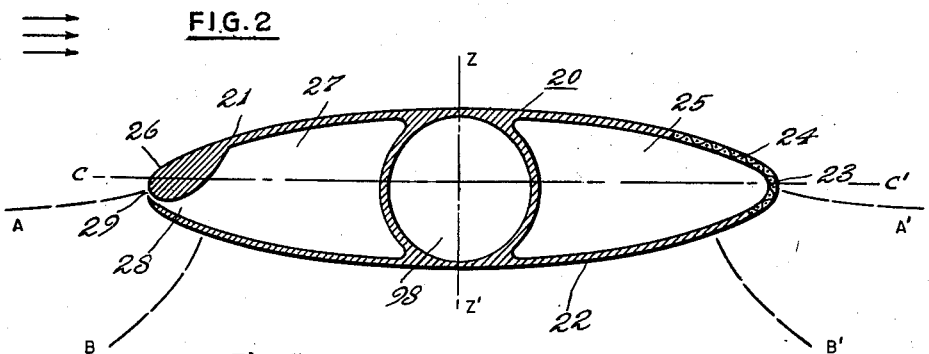
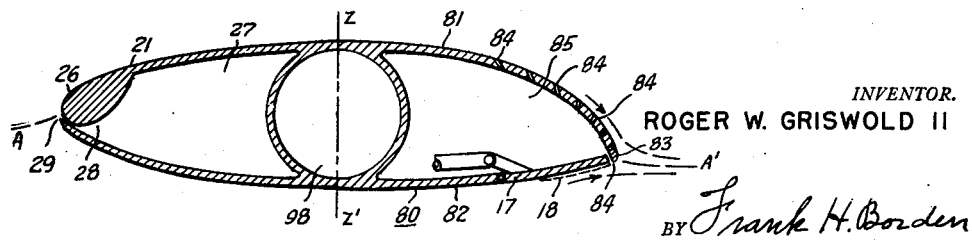
INVENTOR.
ROGER W. GRISWOLD II
BY Frank H. Borden
ATTORNEY March 8, 1960 R. W. GRISWOLD II 2,927,748
DIRECT LIFT AIRFOILS
Filed April 30, 1954 2 Sheets-Sheet 2

INVENTOR
ROGER W. GRISWOLD II
BY
Frank H. Borden
ATTORNEY

United States Patent Office 2,927,748
Patented Mar. 8, 1960

2,927,748

DIRECT LIFT AIRFOILS

Roger W. Griswold II, Old Lyme, Conn., assignor to Elizabeth M. Griswold, doing business as Griswold Company, Old Lyme, Conn.

Application April 30, 1954, Serial No. 426,665

3 Claims. (Cl. 244—42)

This invention relates to powered airfoil systems of the direct lift type for both fixed and rotary-wing aircraft and particularly to a blowing jet disposed in the generally positive pressure quadrant of the leading edge discharging forwardly along the surface leading into the negative pressure field thereof, as used either by itself or in combination with rearwardly disposed suction flow control means and supplemental aerodynamic devices, wherein the combination system effectively and directly controls the position of both front and rear stagnation points on the airfoil independently of angle-of-attack.

The principal objects of this invention are to provide in either the fixed or rotary-wing applications thereof a dual flow control system incorporating a circulation control element hereinafter designated CC element by means of a leading edge blowing jet and a boundary layer control element hereinafter designated as BLC element through rearwardly disposed suction means; to provide a trailing edge configuration of the airfoil which, as the design consequence of the dual flow control system, functions to maintain an effectively sharp Kutta condition at high speeds and an effectively rounded terminal condition as the speed is reduced, so as to control the downwash over and around the trailing edge whereby a forward shift of the rear stagnation point is achieved with correspondingly increased lift; to provide improved flight-induced ejector pump for the BLC element of the direct-lift system which coincidentally incorporates a power generator unit to provide an alternative propulsion and suction-augmentation function; effectively instantaneous dynamic response capabilities for unstalling, preferably avoiding the stall, of wings, rotor blades, control surfaces, and the like; virtual elimination of turbulent separation in the negative field boundary layer flow and thus the drag associated therewith; substantially increased circulation about the airfoil and thus correspondingly high values of lift; essentially no increase in the minimum or cruising speed drag of the airfoil when the jet is inoperative in certain tions a continuously operable pressure jet system which fixed wing applications; and for the rotary wing application is automatically responsive, substantially without lag, to cyclically increase lift, delay stall, decrease drag, and provide self-propulsive effects, within a relative moderate and acceptable range of blade pitching moments; cooperative control of the respective positions of the front and rear stagnation points on the airfoil, independently of angle-of-attack, so as to secure correspondingly large increments of direct lift as functions of the flow control system, alone, without need for airfoil moving parts. Particular objects of the rotary-wing applications are, the complete avoidance of any moving parts whatever in the rotor blade system, per se; an increased range of blade lift coefficients within a reduced range of blade flapping angles; stabilized flow over the blades throughout all flight regimes with consequent alleviation of buffeting and improved vibration characteristics of the rotary-wing system. Other objects and advantages of the invention will become apparent as the description proceeds.

In the acompanying drawings:

Figure 1 graphically relates the lift capabilities of several basic types of airfoil systems, as designated by legends thereon, in connection with which it may be observed as a generalization of powered airfoil flow control systems that the blowing jet type provides circulation control (CC), whereas the suction type ordinarily provides boundary layer control (BLC).

Figure 2 is a cross sectional schematic view taken on line 2—2 of Figure 4, of an illustratively 25% thick bilaterally-symmetrical powdered airfoil about vertical axis Z—Z' incorporating the preferred forwardly-aimed positive quadrant leading edge blowing jet nozzle and communicating pressure duct, a porous surface extending over the rearward upper and lower surfaces of the airfoil and communicating suction duct, and a centrally disposed compressed air duct, with the front and rear dividing streamlines for low and high values of the circulation about the airfoil respectively indicated by dashed lines A—A' and B—B', primarily designed for subsonic operation.

Figure 3 comprises a modified form of the Figure 2 airfoil having a bilaterally-unsymmetrical trailing edge section incorporating a multiplicity of suction slots disposed rearwardly in the airfoil upper and lower surfaces and an adjustable trailing edge split flap forming an effective continuation of the airfoil lower surface in the closed position thereof, showing the respective front and rear dividing streamlines at A—A' indicating a low value of lift for the flap-closed low-suction configuration of the airfoil.

Figure 4 is a schematic segmental plan view partially in section, of a wing or rotor blade tip section comprised of the Figure 2 airfoil at line 2—2 and incorporating a flight-induced ejector pump communicating with the airfoil suction duct, in combination with an alternative propulsor unit comprising a forwardly-disposed combustion chamber, ignition means and a fuel-air nozzle communicating with the airfoil compressed air duct, the ejector discharge passage being shown as provided with counter-tip-vortex fixed swirl vanes.

Figure 5:
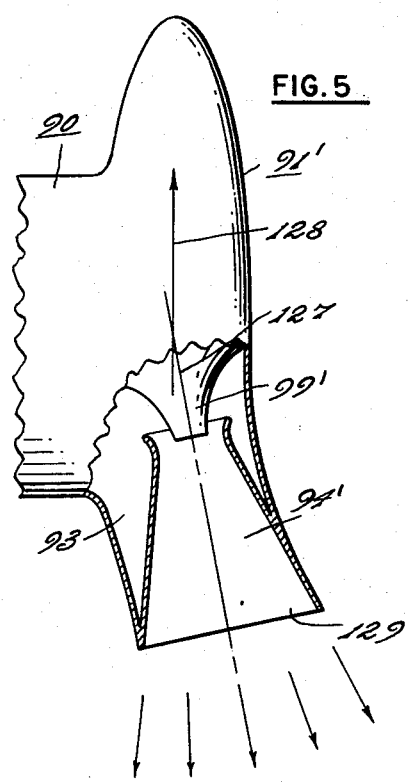
Figure 6:
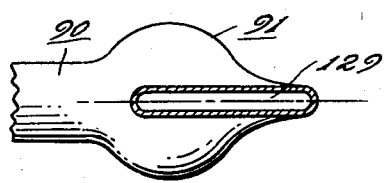

Figures 5 and 6 are respectively schematic segmental plan and rear elevation views partially in section, of a wing or rotor blade tip section with a combination pump-thrust unit similar to that of Figure 4 except that the ejector efflux passage is partially flattened so that the jet discharge therefrom fans out obliquely and oppositely to the direction of relative motion.

Practically all of the prior art powered airfoil developments in the high-lift category, relate to various suction or blowing jet means, or to combination systems, disposed in the upper surface of the airfoil. Where these flow control devices come within the critical flow breakaway region thereof, i.e. from the trailing edge forward over the upper surface almost to the leading edge, they lack the capability of re-establishing the flow, once a stall occurs, until the angle-of-attack has been drastically reduced—since that is the only way to restore contact with the local flow. Such dynamically-unstable types of flow control systems are obviously not suited to the oscillating airfoil requirements of the rotary-wing applications, regardless of what their steady-flow-state efficacy may be. Nor are they hardly more acceptable for the fixed-wing types, from a practical operational standpoint. The large un-stalling time lag, the substantial loss of altitude and the associated precipitous speed increase, are the inevitable consequences (in view of the inertia of such aircraft) of involuntarily stalling-out the airplane in rough air, adverse wind gradients, inadvertent over-control, buffeting, or combinations of these deleterious circumstances. This pernicious process of restoring the design flow control functions of such inherently unsafe powered airfoil devices, becomes progressively more hazardous as the lift-increasing effectiveness thereof is enhanced.

In view of the situation outlined above, it is obviously desirable to apply the requisite flow control energy upstream of the critical break-away region of the airfoil, preferably as far ahead of its negative pressure field as possible, or at least in the forward region thereof. Accordingly, the preferred and simplest form of the invention comprises only a forwardly-aimed blowing jet disposed in the generally positive pressure quadrant of the leading edge, i.e. in the lower surfaces of fixed-wings and rotor blades, as shown in the third quadrant of Figure 2, and in the upper surface of horizontal tail surfaces, for example (which would be the second quadrant in the latter case).

The positive leading edge quadrant is defined as the airfoil nose region between the two axes intersecting at the center of the basic profile leading edge radius, comprised of the generally longitudinal mean camber line axis which precisely determines the division between upper and lower surfaces at the leading edge point (through which the airfoil chord is ordinarily drawn), and the axis normal to the mean camber axis which extends through the generally positive pressure field surface of the airfoil. In brief, such leading edge jet location is designated as in the positive quadrant. The exact location of the forwardly-aimed jet within the positive quadrant, depends upon the airfoil configuration, the purpose for which used, and whether the jet is to be continuously or only transiently operable. In the continuously operable rotary-wing applications wherein positive lift is to be maintained on the blades under all operating conditions, the jet efflux point must accordingly always be above the front stagnation point, or essentially coincident therewith on the advancing blade at high speed, thus placing the efflux point relatively forward in the positive quadrant, per Figure 2. In such of the fixed-wing applications as only use the jet during take-off and landing operations, it is desirable to locate the efflux point more rearwardly in the positive quadrant, either substantially coincident with the front stagnation point at cruising lift coefficients or somewhat below the stagnation point, so as to avoid interference with laminar flow over the forward surfaces of the airfoil when the jet is inoperative at normal speeds. Other advantages of the rearwardly disposed jet at a large angular displacement from the mean camber axis, will become apparent as the description proceeds. It will be understood that the negative pressure field may extend appreciably into or even beyond the positive quadrant at unusually high values of lift, as are easily attained by the instant invention—but that quadrant is still ordinarily in the positive pressure field of the airfoil and the designation thereof as the positive quadrant remains apt.

The chief attribute of the invention is its dynamically positive stall control whereby the lift-productive negative field flow is readily re-established by the jet, effectively without lag, at high angles-of-attack well beyond the power-off stalling angle of the airfoil. It is further characterized by very powerful circulation control capabilities, as the consequence of transferring kinetic energy from the jet to the external local flow (in view of an extremely thin boundary layer) at a highly sensitive and economical point of flow re-energization. In explanation of the latter contention, the jet efflux is set back from the leading edge in the lower surface whereat the local velocity with increasing incidence, is much less than it is over the airfoil leading edge or nose point whereat maximum velocity and minimum pressure obtain. Accordingly, for the same values of lift, the superficially adjacent but upwardly-aimed nose blowing jet of the prior art, will require a substantially higher jet velocity than the unique forwardly-aimed positive quadrant jet, in order to achieve the same kinetic energy transfer and thus induce equal circulation. And since the blower power required to energize the jet is a function of its velocity cubed, it will be obvious that so far as economy as well as lift-increasing effectiveness are concerned, the choice is decisively in favor of the jet configuration taught by this disclosure. It accordingly contributes new and fundamentally important results which are not available in the prior art.

Concurrently with the powerful CC effects of the positive quadrant blowing jet, it may be expected that its effective attachment around the leading edge and over the downstream negative field surface to the trailing edge of the airfoil, will virtually eliminate turbulent separation in the associated boundary layer flow. Accordingly, the profile drag of the airfoil will be correspondingly reduced. At the same time, the residual momentum of the jet will not only provide self-propulsive effects, but because of the very fact that its momentum will by no means ordinarily be spent in passing over the airfoil, the otherwise unsupportable adverse pressure gradients in the negative field flow will be avoided—thus removing the practical limitations in achieving any desired maximum angle-of-attack without stall, as a function of the blowing jet momentum. Since the jet discharges in a generally chordwisely direction, or at only a moderately acute angle to the chord, the direct reaction therefrom does not operate through a very large moment arm with respect to the aerodynamic center of the airfoil. Thus the diving moments from the jet reaction, itself, are small. The upwardly and forwardly inclined resultant negative pressure vector, as modified by the jet, by itself again, will undoubtedly cause a stalling moment on the airfoil. The end result of the above mentioned negative and positive pitching effects from the blowing jet of this invention, can be expected to provide a relatively large range of lift coefficients concurrently with a moderate change in airfoil pitching moments.

It is of further interest to point out that the jet of this invention is injected in a region of convergent laminar flow which is conducive to maintaining the jet, itself, in the laminar state. Thus, provided the relative velocity of the jet is not excessive, this disclosure may lead to new techniques for laminar boundary layer control.

The position of the front stagnation point on the airfoil may be controlled within rather wide limits, as a function of the applied momentum of the positive quadrant blowing jet. Accordingly, if effectively-rounded trailing edge flow control means are substituted for the conventional sharp trailing edge with its characteristic Kutta fixation of the rear stagnation point, both front and rear stagnation points on the airfoil may then be coupled for conjoint movement of both by means of the cooperative interaction from the leading and trailing edge combination powered airfoil system. This dual flow control principle which is illustratively indicated by Figure 2 and more fully elaborated subsequently, will obviously provide greatly increased downwash over the effectively-rounded trailing edge with correspondingly augmented high-lift circulation about the airfoil.

Directly powered airfoils are herein designated simply as powered airfoils.

The term suction means as used herein refers to the Figs. 2 and 3 suction organizations or modifications thereof.

The dual flow control system of this invention is directly energized and effective to provide CC and BLC over the airfoil, respectively, and circulation responsive rearward movement of the front stagnation point and forward movement of the rear stagnation point incident to the positive pressure surface of the airfoil as a function of the applied flow control energy.

The relatively low maximum lift limits of conventional airfoils result from two limiting phenomena, being initiated by trailing edge turbulent separation and terminated as a consequence of leading edge laminar separation. The trailing edge turbulent separation phenomenon is associated with essential fixation of the rearward stagnation point approximately at the terminal edge of the airfoil, which, when functionally-sharp, accordingly precludes lift increase for a given flap deflection, except by changing angle-of-attack within the limits originally determined by the sharp trailing edge. Increasing the incidence of conventional airfoils so as to increase the lift thereof, leads to unsupportable adverse pressure gradients in the flow over the rearward part of the upper surface, in view of viscosity effects, thus precipitating turbulent separation with consequent progressive deterioration of the boundary layer, until this disorganized upper surface flow finally and abruptly coincides with leading edge laminar separation. This latter conjoint phenomenon constitutes the well-known stall that easily rates as the chief limitation of conventional airfoils. The effectively sharp trailing edge of the conventional airfoil provides what is known as the Kutta condition, i.e., it effectively fixes the rear stagnation point essentially at the trailing edge. This means that lift increase is completely dependent upon angle-of-attack, alone, or in combination with a trailing edge flap, which latter mechanically shifts the rear stagnation point in a rather crude manner.

In Figure 2, lines A—A' indicate the respective front and rear dividing streamlines for low circulation about the airfoil, while lines B—B' indicate the corresponding positions thereof with high circulation, i.e. at low and high lift coefficients, respectively. The leading edge stagnation pressure points occur where streamlines A or B impinge on the airfoil surface. The trailing edge stagnation pressure points occur at the airfoil surface where streamlines A' or B' accelerate from zero initial velocity in a downstreamwardly direction. A' and B' might also be considered as confluence streamlines, but from the theoretical standpoint that the contiguous local flows do not mix, the generally accepted designation of rear dividing streamline is quite proper and is so used herein. As the ratio of the blowing jet velocity to that of the freestream relative airflow is progressively increased above unity, i.e. for $v_j/v_0 > 1.0$, the circulation about the airfoil is correspondingly augmented by transfer of kinetic energy from the jet to the external local flow through viscous shear transfer action, and the front dividing streamline moves downwardly and rearwardly, as from A to B. The boundary layer is controlled over the upper surface and adjacent to the trailing edge, by suction through the porous surface 24 of Figure 2, and by the plurality of suction slots 84—84 of Figure 3, as is well known to the art.

With the establishment of essentially potential flow about the airfoil by the related suction means, i.e. the deteriorating boundary layer is avoided, and with the lift increase no longer inhibited by a functionally-sharp trailing edge, the high velocity flow over the upper surface accordingly follows the effectively curved rear profile and meets the relatively low velocity lower surface flow at the demarcation line B', where the respective velocities and pressures are equalized. So long as the blowing jet operatively maintains positive circulation about the airfoil, and essentially potential flow is maintained by the suction element of the system, the position of the rear dividing streamline and stagnation point will be positively coupled conjointly with the corresponding position of such at the front of the airfoil, as is inevitably determined by the blowing jet CC element of the system without need for any sharp-edged rear flap device. While the bilaterally-symmetrical profiles about the vertical axis Z—Z', as in Figure 2, may be preferred for some fixed-wing applications and for helicopter rotor blade flow control systems, it is to be understood that the invention is not limited to such profile types and that any powered airfoil configuration may be used which effectively provides functionally rounded leading and trailing edges for the airfoil.

Accordingly, the simple aerodynamics of the powered airfoil are herein combined, to provide a particularly appropriate and effective flow control system for the helicopter application. For such cases it is not mandatory, but is preferred, as a safety measure in autorotative descent on engine failure, for instance, that any essential blowing or suction pumping system, additionally to that available centrifugally, be continuously operative as a function of blade rotation, i.e. any inboard auxiliary blower that is required for other than optional functions, will be driven by the rotor, irrespective of power supply from the main engine, similar to current tail rotor drive systems. The mechanics of such arrangements are well known to the art and accordingly nothing by way of invention would be added to this disclosure by inclusion of detailed specifications and drawings of these mechanical features herein.

In many of the fixed-wing applications of this invention, it is likely that the complete dual flow control system will only be operationally used to improve the aerodynamic characteristics of the airfoil in the high-lift range (i.e. for increased lift and relatively reduced drag) as in take-off, landing, climb, maximum ceiling, high-g maneuvers, or slow speed flight. On the other hand, for maximum economy aircraft cruising at intermediate speeds, often over long ranges, a continuously and fully operable powered airfoil system such as indicated by Fig. 2, for example, is capable of providing improved airplane lift/drag ratios at such cruising lift coefficients. In some cases, the leading edge jet will be shut-off at normal cruising speed. For other cases wherein the CC element of the system may be inoperable for any reason in the high speed range, and the airfoil configuration is such that BLC alone will not maintain stable local flow and thus positive circulation about the airfoil, reference may be made to the rearward section of an airfoil shown at 80 in Fig. 3. In this fragmentary illustration the upper surface 81 of the airfoil has a downwardly curved rear surface ending in the trailing edge 83. The rearwardly curved surface is provided with a series of chordwisely spaced slits or slots 84—84 extending from the outer surface to communication with the suction duct 85. The lower surface 82 has a flap 17 pivoted to it as an effective continuation thereof. The flap 17 at its rear end is housed in spaced relation to the dependent trailing edge 83 to define an additional suction slot 84 therewith. The flap is pilot-controllable to swing downwardly on its pivot through large angular deflections to provide substantial lift-increasing effects, or merely to the position indicated in dotted lines at 18. This latter is used when the blowing jet is shut off at high speeds to provide a trailing edge discontinuity thereby imparting an effective sharp edge to the trailing edge section to fix the rear stagnation point and prevent it from oscillating or shifting around the rounded trailing edge in high speed flight. With the Figs. 2 and 3 bulbous trailing edge airfoils when the suction flow coefficients are below the minimum critical values, a simple split flap such as shown at 17 in Fig. 3, may be deflected downwardly by about one degree as indicated by dotted line 18, to provide a structurally and functionally sharp trailing edge, so as to positively localize the front and rear dividing streamlines and stagnation points for such high speed inoperable-blowing jet operation, without noticeable increase in drag. It is not anticipated that this particular flow instability problem will be experienced in the rotary-wing case.

It will be noted that the distributed area suction systems comprised of the porous surface 24 of Figure 2 and the multiple slots 84—84 of Figure 3 are disposed over a greater extent of the upper surfaces than the lower surfaces of the respective airfoil configurations. The reason therefor is that the emphasis on the BLC element of the system has herein been primarily directed to the control of turbulent separation over the upper surface of the airfoil, so as to maintain essentially potential flow at high-lift values of the circulation, as attained by the blowing jet. For those cases where it may prove to be practical to delay the occurrence of the laminar transition phenomenon over the airfoil surfaces in the low-lift coefficient range, the distributed suction systems may then extend over substatnially the same areas in the lower as well as in the upper surface, provided, according to the principal objectives of this invention that the high-lift BLC function of upper surface suction is not thereby materially impaired.

With the type of system herein proposed it would obviously impose intolerable penalties in the helicopter application to dissipate energy in counteracting the centrifugal pumping action which is inherent in blade rotation, by providing an inboard suction pump for the BLC element of the system. Accordingly, it is a further basic tenet of this invention that in the helicopter application thereof, the blowing jet air supply will be taken aboard the aircraft hubwardly, preferably by any suitable means which increase the ambient pressure thereof prior to injection into the rotor blade, while the suction flow which is independent of the blowing jet flow will be "dumped overboard" in an advantageous manner at the blade tips, as is more fully detailed by Figures 4, 5 and 6. In other words, both the blowing and suction flows progress naturally and radially outward through the blades.

In Figure 4, rotor blade or fixed-wing 90 carries combination pump-thrust unit 91 which provides the outboard terminal end of pressure duct 27 at wall 92, but communicates with suction duct 25 via passage 93 which in turn leads the suction flow comprising the secondary fluid into ejector 94. Unit 91 further comprises forwardly disposed combustion chamber 95, spark plug or other ignition means 96, combination fuel-air nozzle 97—97, communicating with compressed air duct 98 leading from blade 90 into combustion chamber 95 which terminates in primary working fluid nozzle 99 discharging into the rearwardly disposed ejector 94. If desired, ejector 94 may be provided at its terminal end with counter-tip-vortex fixed swirl vanes 125—125, the function of which is to impart vortical flow into the suction or mixed-flow discharge from ejector 94, as the case may be. Such vortical flow, as indicated at 126—126, having predeterminedly opposite rotation to that of the natural blade or wing tip aerodynamic vortices will thus neutralize the detrimental effects of the latter to a considerable extent and thereby alleviate buffeting in rotor systems, in particular, and increase the effective aspect ratios of both rotary and fixed-wings with corresponding reduction of induced drag. It is, of course, obvious that such a combination ejector pump and propulsor unit is equally applicable to fixed-wing aircraft and to rotary-wing systems. Also that in either type of aircraft the combustion and the propulsion functions of the combined pump-thrust unit are optional, since the flight-induced low pressure available at the approximate center of the natural tip vortices is sufficient, by itself, to maintain suction operation of the BLC element of the flow control system, but at a lower level thereof than when unit 91 is providing thrust rather than creating drag. It will also be clear that there is the additional option of having primary nozzle 99 discharge either compressed air, alone, or the combustion fluid. For the latter case and with gas turbine engines which are especially designed to provide moderate or even substantial compressor bleed, unit 91 could serve with advantage as a continuously-operable secondary propulsor device in certain fixed-wing applications. The flexibility of this pump-thrust system is particularly appropriate in the helicopter application, since the propulsor function thereof will augment the effective over-all power available of the aircraft for the vertical flight operations whereat maximum power is currently required. Coincidentally the operable propulsor function will substantially augment the ejector suction pump action with corresponding enhancement of the rotor blade BLC system.

Figures 5 and 6 are respectively plan and rear elevation views of a generally similar pump-thrust unit 91', except that primary nozzle 99' is canted obliquely outward to the direction of relative motion, as indicated at 127—128, respectively, the axis of ejector 94' is aligned with that of nozzle 99, but ejector 94' tapers to a substantially flattened efflux slot 129 and the rearward outer contour of unit 91 is appropriately modified accordingly. Thus, the suction or mixed-flow discharge from ejector 94' fans rearwardly and outwardly in substantial parallelism in this case, with the mean plane of the wing chord. Alternatively, efflux slot 129 may be substantially normal to the latter (or at intermediate angular positions) so as to direct the ejector discharge flow rearwardly and downwardly, thus creating a substantial fluid end-plate effect for the wing or blade tip.

The principal objectives of the foregoing described combination ejector pump and propulsor units which are not necessarily limited to wing or blade tip locations, are to provide appropriate suction pump means for the BLC element of the invention, coincidentally with alternative propulsion and suction-augmentation means, which together are operatively effective to improve the tip aerodynamic characteristics of fixed-wings and rotor blades, as herein illustratively but not limitatively disclosed. It is obvious that such units, similarly to primary propulsion units, could also be disposed inboard from the wing or blade tips.

It will be understood that for applications of the invention wherein the blowing jet discharges below critical sonic velocities, that the relatively low pressure air supply thereof, in contrast to the high pressure compressed air supply for the supercritical velocity jet, may alternatively be obtained from various gas turbine compound power plants, such as ducted-fan, by-pass, or turbofan engines, or from any other suitable power source. Further, that such power sources may equally well serve to energize the suction fluid flow, alone, or together with that for the blowing jet for those cases wherein the fluid flow is common to both elements of the dual flow control system. Also that, subject to the installation and operational requirements of particular applications, the blowing jet and suction fluid flows may be completely independent of each other, or a common fluid flow may serve both the CC and BLC functions, according to the flow control flexibility that is desired respecting continuous or intermittent operation of one or both fluid flows.

Having thus described my invention, I claim:

1. In a powered airfoil having upper and lower surfaces merging into rounded leading and trailing edge sections thereof, a jet nozzle asymmetrically-disposed in a portion of said leading edge section adjacent one of said surfaces and forwardly-directed and curving into the other of said surfaces, duct means for transporting relatively high pressure fluid flow therethrough communicating with said nozzle for discharging when operatively pressurized a blowing jet therefrom into the circulatory flow about said airfoil, suction flow passage means disposed generally in said trailing edge section, duct means for transporting relatively low pressure fluid flow therethrough communicating with said suction means for induction when operatively pressurized of local boundary layer flow therethrough, whereby said blowing jet effects direct-lift control of the circulation about said airfoil and said suction means maintain essentially potential flow through control of the boundary layer thereover.

2. A powered airfoil as in claim 1, wherein said jet nozzle is arranged to direct said blowing jet upwardly over said leading edge section.

3. A powered airfoil as recited in claim 1, wherein said airfoil incorporates a lift-increasing flap disposed adjacent to said trailing edge section, said flap being adjustable between a retracted position wherein it forms a continuation of said lower surface and a deflected position wherein it projects below said lower surface and presents a sharp rear terminal edge to the relative airflow thereover when said flap is deflected, whereby the circulation about said airfoil may be positively maintained with an element of said flow control system inoperative and the lift of said airfoil for the case of the completely inoperative system is materially increased when said flap is fully deflected.

References Cited in the file of this patent

UNITED STATES PATENTS

| | | |
|---|---|---|
| 1,744,889 | Hammons | Jan. 28, 1930 |
| 1,879,717 | Sikorsky | Sept. 27, 1932 |
| 1,887,148 | Ganahl | Nov. 8, 1932 |
| 1,979,298 | Trey et al. | Nov. 6, 1934 |
| 2,078,854 | Jones | Apr. 27, 1937 |
| 2,223,744 | Stalker | Dec. 3, 1940 |
| 2,408,788 | Ludington et al. | Oct. 8, 1946 |
| 2,447,100 | Stalker | Aug. 17, 1948 |
| 2,477,461 | Lee | July 26, 1949 |
| 2,514,513 | Price | July 11, 1950 |
| 2,589,732 | Riviere | Mar. 18, 1952 |
| 2,759,548 | Yuan | Aug. 21, 1956 |

FOREIGN PATENTS

| | | |
|---|---|---|
| 584,585 | Germany | Sept. 21, 1933 |
| 634,332 | Great Britain | Mar. 15, 1950 |